US010674425B2

(12) United States Patent
Gulati et al.

(10) Patent No.: US 10,674,425 B2
(45) Date of Patent: Jun. 2, 2020

(54) SYSTEMS, METHODS, AND APPARATUS FOR MANAGING A RELAY CONNECTION IN A WIRELESS COMMUNICATIONS NETWORK

(71) Applicant: QUALCOMM Incorporated, San Diego, CA (US)

(72) Inventors: Kapil Gulati, Franklin Park, NJ (US); Saurabha Rangrao Tavildar, Jersey City, NJ (US); Sudhir Kumar Baghel, Bridgewater, NJ (US); Shailesh Patil, Raritan, NJ (US); Michaela Vanderveen, Tracy, CA (US); Bilal Sadiq, Basking Ridge, NJ (US); Hong Cheng, Basking Ridge, NJ (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 15/080,462

(22) Filed: Mar. 24, 2016

(65) Prior Publication Data

US 2016/0295494 A1 Oct. 6, 2016

Related U.S. Application Data

(60) Provisional application No. 62/141,064, filed on Mar. 31, 2015.

(51) Int. Cl.
*H04W 40/22* (2009.01)
*H04B 7/155* (2006.01)
(Continued)

(52) U.S. Cl.
CPC ........ *H04W 40/22* (2013.01); *H04B 7/15507* (2013.01); *H04W 72/085* (2013.01);
(Continued)

(58) Field of Classification Search
CPC .......... H04L 2012/5608; H04W 84/12; H04W 88/08; H04W 80/04; H04W 88/06; H04W 84/18; H04W 74/08
(Continued)

(56) References Cited

U.S. PATENT DOCUMENTS 8,270,374 B2 * 9/2012 Cai .................. H04W 36/0055
370/252
8,570,955 B2 * 10/2013 Viorel ................... H04L 5/0048
370/329
(Continued)

FOREIGN PATENT DOCUMENTS

CN 104469926 A 3/2015
WO 2011153507 A2 12/2011
(Continued)

OTHER PUBLICATIONS

3GPP TR 23.703: "3rd Generation Partnership Project, Technical Specification Group Services and System Aspects, Study on Architecture Enhancements to Support Proximity-Based Services (ProSe) (Release 12)", 3rd Generation Partnership Project (3GPP), Mobile Competence Centre, 650, Route Des Lucioles, F-06921 Sophia-Antipolis Cedex, France, vol. SA WG2. No. V12.0.0, Mar. 10, 2014 (Mar. 10, 2014), pp. 1-324, XP002758292, paragraph [4.1.3] p. 170, paragraph 6.3—p. 213 paragraph [annexK].
(Continued)

*Primary Examiner* — Brenda H Pham
(74) *Attorney, Agent, or Firm* — Arent Fox LLP

(57) ABSTRACT

A UE may move out of range of a network. Accordingly, the UE may use a relay node to communicate. To manage the relay node, a wireless device such as the UE may receive a relay search message from a second UE requesting a relay UE to establish a connection to the network through the relay UE. The UE may transmit a message to a base station informing the base station of the relay search message from
(Continued)

the second UE. The UE may receive an initiate relay association procedure message from the base station, the initiate relay association procedure message informing the first UE that the first UE has been selected by the base station to initiate a relay association procedure with the second UE. The UE may transmit a relay association message to the second UE including a request to be the relay UE for the second UE.

20 Claims, 11 Drawing Sheets

(51) Int. Cl.
*H04W 76/10* (2018.01)
*H04W 72/08* (2009.01)
*H04W 88/04* (2009.01)
*H04W 8/00* (2009.01)

(52) U.S. Cl.
CPC ............ *H04W 76/10* (2018.02); *H04W 8/005* (2013.01); *H04W 88/04* (2013.01)

(58) Field of Classification Search
USPC ..... 370/310.2, 328, 338, 349, 331, 332, 333
See application file for complete search history.

(56) References Cited

U.S. PATENT DOCUMENTS

| | | | |
|---|---|---|---|
| 9,319,215 B2 | 4/2016 | Bao et al. | |
| 9,571,587 B1* | 2/2017 | Zhou | H04W 72/00 |
| 9,706,341 B2* | 7/2017 | Lee | H04W 76/14 |
| 9,853,709 B2* | 12/2017 | Ryu | H04B 7/15507 |
| 9,894,591 B2* | 2/2018 | Chung | H04W 40/22 |
| 2008/0108369 A1* | 5/2008 | Visotsky | H04B 7/2606 455/455 |
| 2009/0285112 A1* | 11/2009 | Lee | H04B 7/2606 370/252 |
| 2010/0150103 A1 | 6/2010 | Womack et al. | |
| 2010/0150104 A1* | 6/2010 | Yoon | H04W 36/0011 370/331 |
| 2010/0167743 A1* | 7/2010 | Palanki | H04B 7/155 455/436 |
| 2010/0304665 A1* | 12/2010 | Higuchi | H04B 7/15535 455/7 |
| 2012/0307668 A1* | 12/2012 | Wiemann | H04W 24/00 370/252 |
| 2013/0003650 A1* | 1/2013 | Han | H04B 7/155 370/315 |
| 2014/0171062 A1* | 6/2014 | Fallgren | H04W 40/22 455/422.1 |
| 2014/0242963 A1* | 8/2014 | Novlan | H04W 48/16 455/418 |
| 2015/0271856 A1* | 9/2015 | Tong | H04W 16/26 455/426.1 |
| 2016/0182145 A1* | 6/2016 | Shi | H04W 76/14 455/436 |
| 2016/0249330 A1* | 8/2016 | Jung | H04W 76/14 |

FOREIGN PATENT DOCUMENTS

| | | |
|---|---|---|
| WO | 2014051126 A1 | 4/2014 |
| WO | 2015026200 A1 | 2/2015 |

OTHER PUBLICATIONS

International Search Report and Written Opinion—PCT/US2016/024342—ISA/EPO—Jun. 10, 2016.
ZTE: et al., "Discussion on Relay Initiation and Discovery", 3GPP Draft, R2-153765—Discussion on Relay Initiation and Discovery, 3rd Generation Partnership Project (3GPP), Mobile Competence Centre, 650, Route Des Lucioles, F-06921 Sophia-Antipolis Cedex, France, vol. RAN WG2, No. Beijing, China, 20150824-20150828 Aug. 23, 2015 (Aug. 23, 2015), XP051004411, pp. 1-5, Retrieved from the Internet: URL: http://www.3gpp.org/ftp/Meetings_3GPP_SYNC/RAN2/Docs/ [retrieved on Aug. 23, 2015] the whole document.
ZTE (Rapporteur): "Report of Email Discussion [90#25] [LTE/ProSe] Relay UE Initiation, Discovery and Selection/Re-Selection", 3GPP Draft, R2-153764 Report of 90#25 Relay UE, 3rd Generation Partnership Project (3GPP), Mobile Competence Centre, 650, Route Des Lucioles, F-06921 Sophia-Antipolis Cedex, France, vol. Ran WG2, No. Beijing, China, 20150824-20150828 Aug. 15, 2015 (Aug. 15, 2015), XP050994082, pp. 1-41, Retrieved from the Internet: URL: http://www.3gpp.org/ftp/tsg_ran/WG2_RL2/TSGR2_91/Docs/ [retrieved on Aug. 15, 2015] the whole document.

* cited by examiner

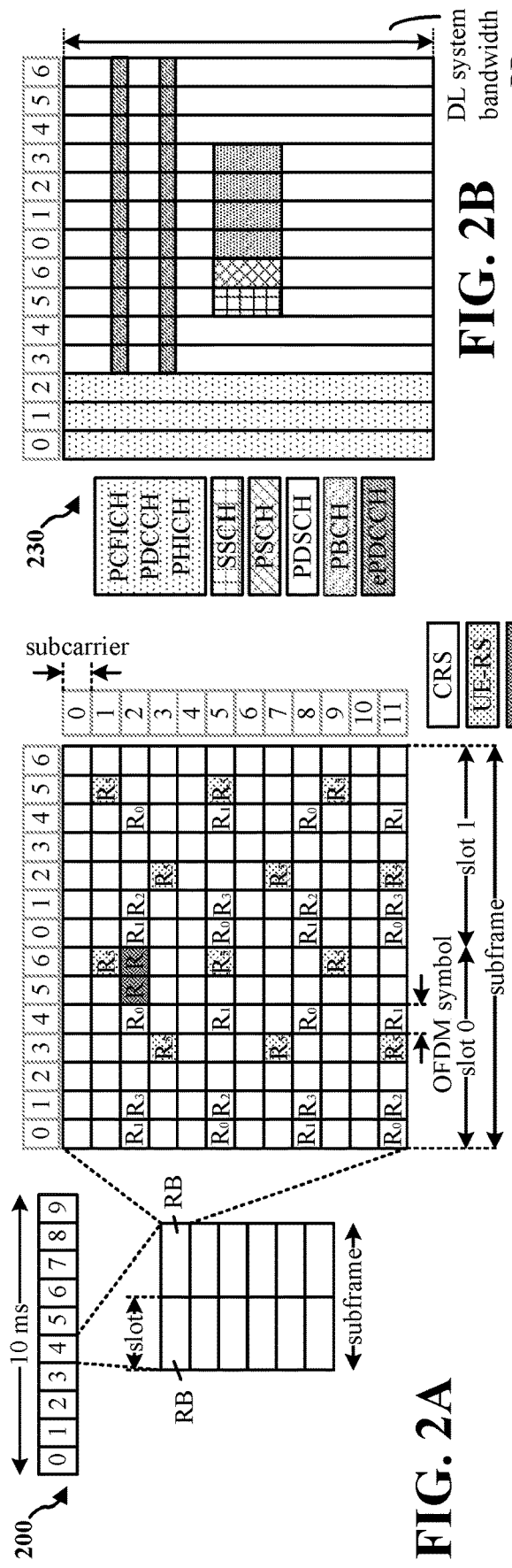
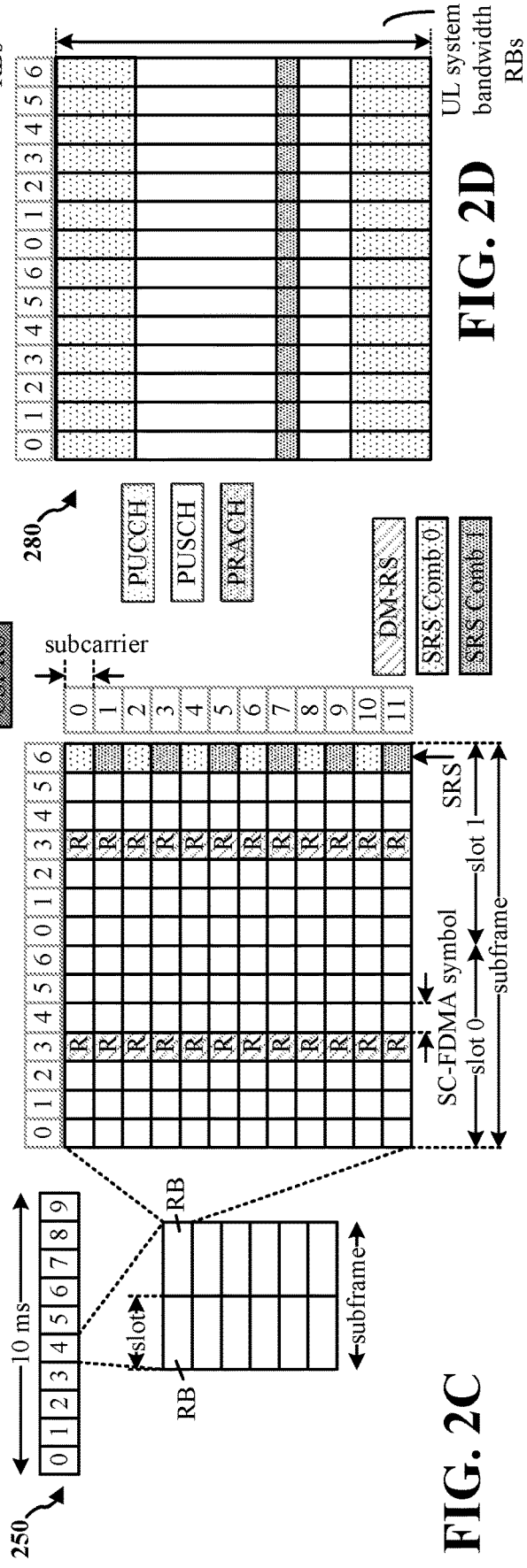
FIG. 2A  FIG. 2B  FIG. 2C  FIG. 2D

SYSTEMS, METHODS, AND APPARATUS FOR MANAGING A RELAY CONNECTION IN A WIRELESS COMMUNICATIONS NETWORK

CROSS-REFERENCE TO RELATED APPLICATION(S)

This application claims the benefit of U.S. Provisional Application Ser. No. 62/141,064, entitled "Systems, Methods, and Apparatus for Managing a Relay Connection in a Wireless Communications Network" and filed on Mar. 31, 2015, which is expressly incorporated by reference herein in its entirety.

BACKGROUND

Field

The present disclosure relates generally to communication systems, and more particularly, to relay connections in a wireless communication network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In LTE-D operations, a UE may move out of range of base station coverage. When the UE moves out of range of base station coverage, in order to continue a communication with a network, the UE may use a ProSe UE-to-Network Relay node. The ProSe UE-to-Network Relay node needs to be managed in some way, however.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

As described above, in LTE-D operations, a user equipment (UE) may move out of range of base station coverage. When the UE moves out of range of base station coverage, in order to continue a communication with a network, the UE may use a ProSe UE-to-Network Relay node. The ProSe UE-to-Network Relay node needs to be managed in some way, however.

Managing the relay node may include receiving a relay search message from a second UE. The second UE may request a relay UE to establish a connection to the wireless communications network through the relay UE. Managing the relay node may include the UE may transmitting a message to a base station informing the base station of the relay search message from the second UE. Managing the relay node may include receiving an initiate relay association procedure message from the base station. The initiate relay association procedure message may inform the first UE that the first UE has been selected by the base station to initiate a relay association procedure with the second UE.

At a base station, managing the relay node may include receiving a message from at least one relay UE informing the base station of a relay search message from a first UE. Additionally, managing the relay node may include selecting one relay UE of the at least one relay UEs to initiate a relay association procedure. Furthermore, managing the relay node may include transmitting an initiate relay association procedure message to the one relay UE, the initiate relay association procedure message informing the one relay UE that the one relay UE has been selected by the base station to initiate a relay association procedure.

In an aspect of the disclosure, a method, a computer program product, and an apparatus are provided. The apparatus may be a wireless device such as a UE. The UE may receive a relay search message from a second UE requesting a relay UE to establish a connection to the wireless communications network through the relay UE. The UE may transmit a message to a base station informing the base station of the relay search message from the second UE. The UE may receive an initiate relay association procedure message from the base station. The initiate relay association procedure message informs the first UE that the first UE has been selected by the base station to initiate a relay association procedure with the second UE.

In another aspect of the disclosure, a method, a computer program product, and an apparatus are provided. The apparatus may be a base station. The base station may receive a message from at least one relay UE informing the base station of a relay search message from a first UE. The base station may select one relay UE of the at least one relay UEs to initiate a relay association procedure. The base station may transmit an initiate relay association procedure message to the one relay UE. The initiate relay association procedure message informs the one relay UE that the one relay UE has been selected by the base station to initiate a relay association procedure.

Some examples may include an apparatus for managing a relay connection through a relay device in a wireless communications network. The apparatus may include means for receiving a relay search message from a second UE requesting a relay UE to establish a connection to the wireless communications network through the relay UE. The apparatus may include means for transmitting a message to a base station informing the base station of the relay search message from the second UE. The apparatus may include means for receiving an initiate relay association procedure message from the base station.

In some examples, the apparatus may further include means for sending a UE capability information message to the base station indicating at least one of UE relay capabilities at the first UE or relay capacity supported at the first UE. In some examples, the apparatus may further include means for receiving an acknowledgment from the second UE indicating that the second UE has selected the first UE as the relay device. In some examples, the apparatus may further include means for receiving a message from the second UE declining the request from the first UE to be the relay for the second UE. In some examples, the apparatus may further include means for receiving a reference signal concurrently with the discovery message and means for determining at least one of an RSRP or an RSRQ based on the received reference signal.

In some examples, the apparatus may further include means for receiving a message from the base station requesting periodic reporting of second UE-to-relay link quality and means for transmitting a message to the second UE requesting periodic reporting of second UE-to-relay link quality based on the message from the base station requesting periodic reporting of second UE-to-relay link quality.

In some examples, the apparatus may further include means for receiving a message containing information regarding second UE-to-relay link quality from the second UE in response to the message to the second UE requesting periodic reporting of second UE-to-relay link quality and means for transmitting a message to the base station including information regarding second UE-to-relay link quality based on the message containing information regarding second UE-to-relay link quality received from the second UE.

In some examples, the apparatus may further include means for receiving a message from the base station in response to the second UE-to-relay link quality instructing the second UE to reinitiate a relay search procedure, including transmitting another relay search message. In some examples, the apparatus may further include means for transmitting a message to the second UE instructing it to reinitiate the relay search procedure.

In some examples, the apparatus may further include means for receiving a reference signal concurrently with a ProSe measurement channel. In some examples, the apparatus may further include means for determining at least one of an RSRP or an RSRQ based on the received reference signal. In some examples, the apparatus may further include means for transmitting a message to the base station including information regarding second UE-to-relay link quality including at least one of the determined RSRP or RSRQ.

In some examples, the apparatus may further include means for receiving a message from the base station in response to the second UE-to-relay link quality instructing the second UE to reinitiate the relay search procedure. In some examples, the apparatus may further include means for transmitting a message to the second UE instructing it to reinitiate the relay search procedure.

Some examples may include an apparatus for managing a relay connection in a wireless communications network at a base station. The apparatus may include means for receiving a message from at least one relay UE informing the base station of a relay search message from a first UE. In some examples, the apparatus may further include means for selecting one relay UE of the at least one relay UEs to initiate a relay association procedure. In some examples, the apparatus may further include means for transmitting an initiate relay association procedure message to the one relay UE.

In some examples, the apparatus may further include means for transmitting a message to the selected relay UE requesting periodic reporting of second UE-to-relay link quality. In some examples, the apparatus may further include means for receiving the requested periodic reporting of second UE-to-relay link quality. In some examples, the apparatus may further include means for determining if a relay for the second UE should be moved to another relay UE based on the requested periodic reporting of the second UE-to-relay link quality.

Some examples may include a computer-readable medium storing computer executable code. The code may be to receive a relay search message from a second UE requesting a relay UE to establish a connection to a wireless communications network through the relay UE. The code may be to transmit a message to a base station informing the base station of the relay search message from the second UE. The code may be to receive an initiate relay association procedure message from the base station.

In some examples, the code may be to receive a message from at least one relay UE informing a base station of a relay search message from a first UE. In some examples, the code may be to select one relay UE of the at least one relay UEs to initiate a relay association procedure. In some examples, the code may be to transmit an initiate relay association procedure message to the one relay UE, the initiate relay association procedure message informing the one relay UE that the one relay UE has been selected by the base station to initiate a relay association procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
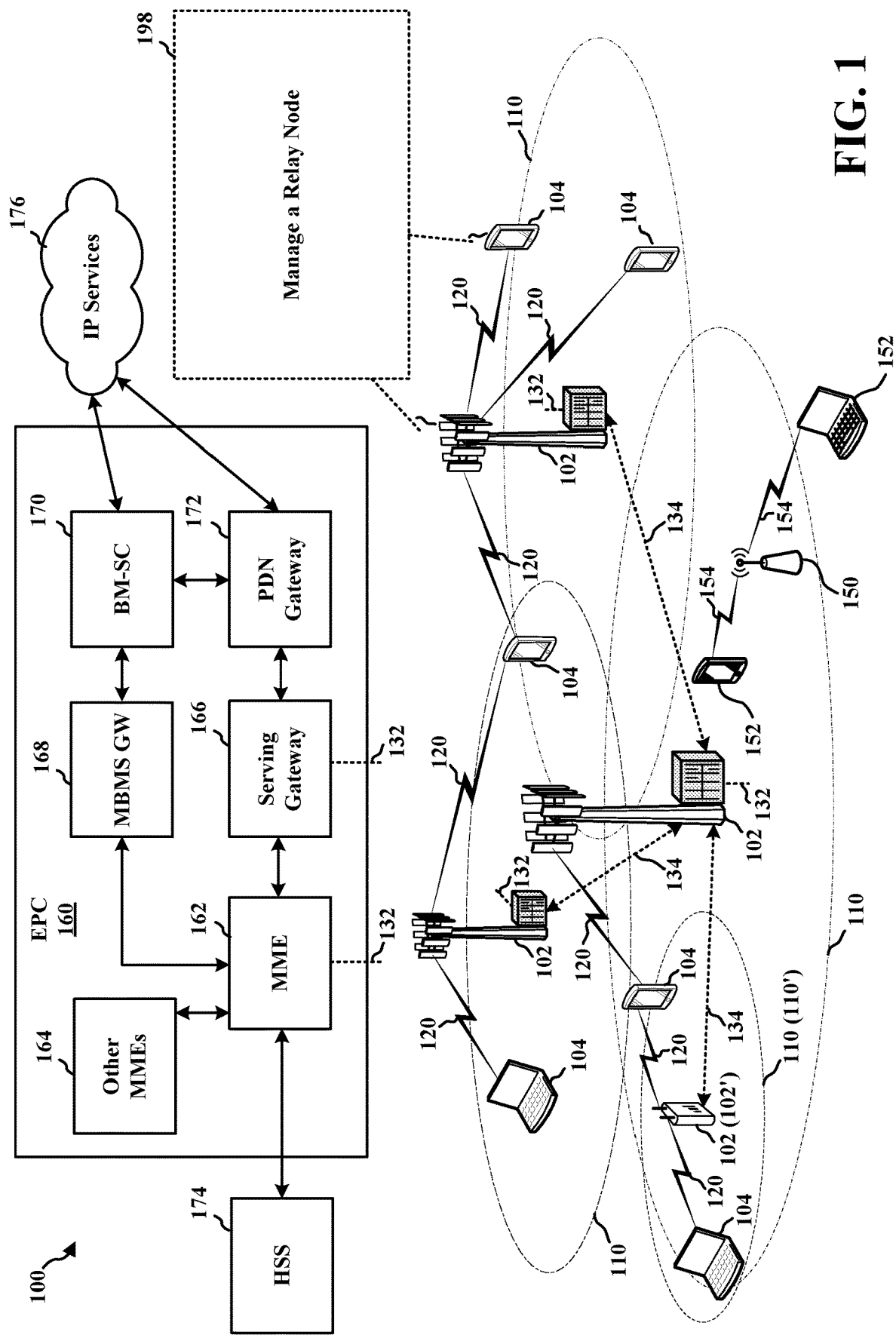
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage a relay node (198). Managing the relay node may include receiving a relay search message from a second UE. The second UE may request a relay UE to establish a connection to the wireless communications network through the relay UE. Managing the relay node may include transmitting a message to a base station informing the base station of the relay search message from the second UE. Managing the relay node may include receiving an initiate relay association procedure message from the base station. The initiate relay association procedure message may inform the first UE that the first UE has been selected by the base station to initiate a relay association procedure with the second UE. Additionally, in some examples, managing the relay node may include transmitting a relay association message to the second UE. The relay association message may include a request to be the relay UE for the second UE (198).

Additionally, in certain aspects, the eNB 102 may be configured to managing the relay node (198). At a base station, managing the relay node may include receiving a message from at least one relay UE. The message may inform the base station of a relay search message from a first UE. Additionally, managing the relay node may include selecting one relay UE of the at least one relay UEs to initiate a relay association procedure. Furthermore, managing the relay node may include transmitting an initiate relay association procedure message to the one relay UE. The initiate relay association procedure message may inform the one relay UE that the one relay UE has been selected by the base station to initiate a relay association procedure (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
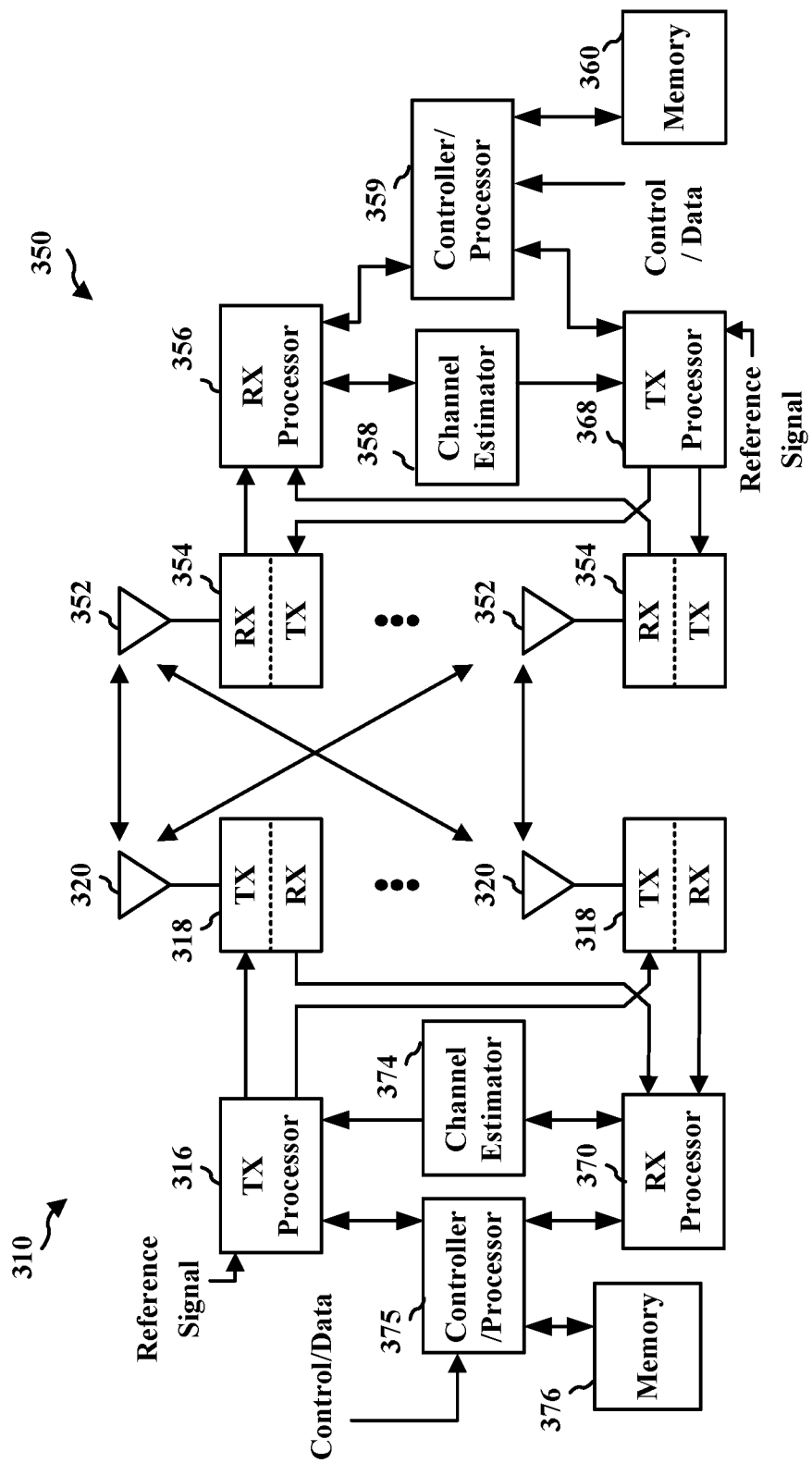
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
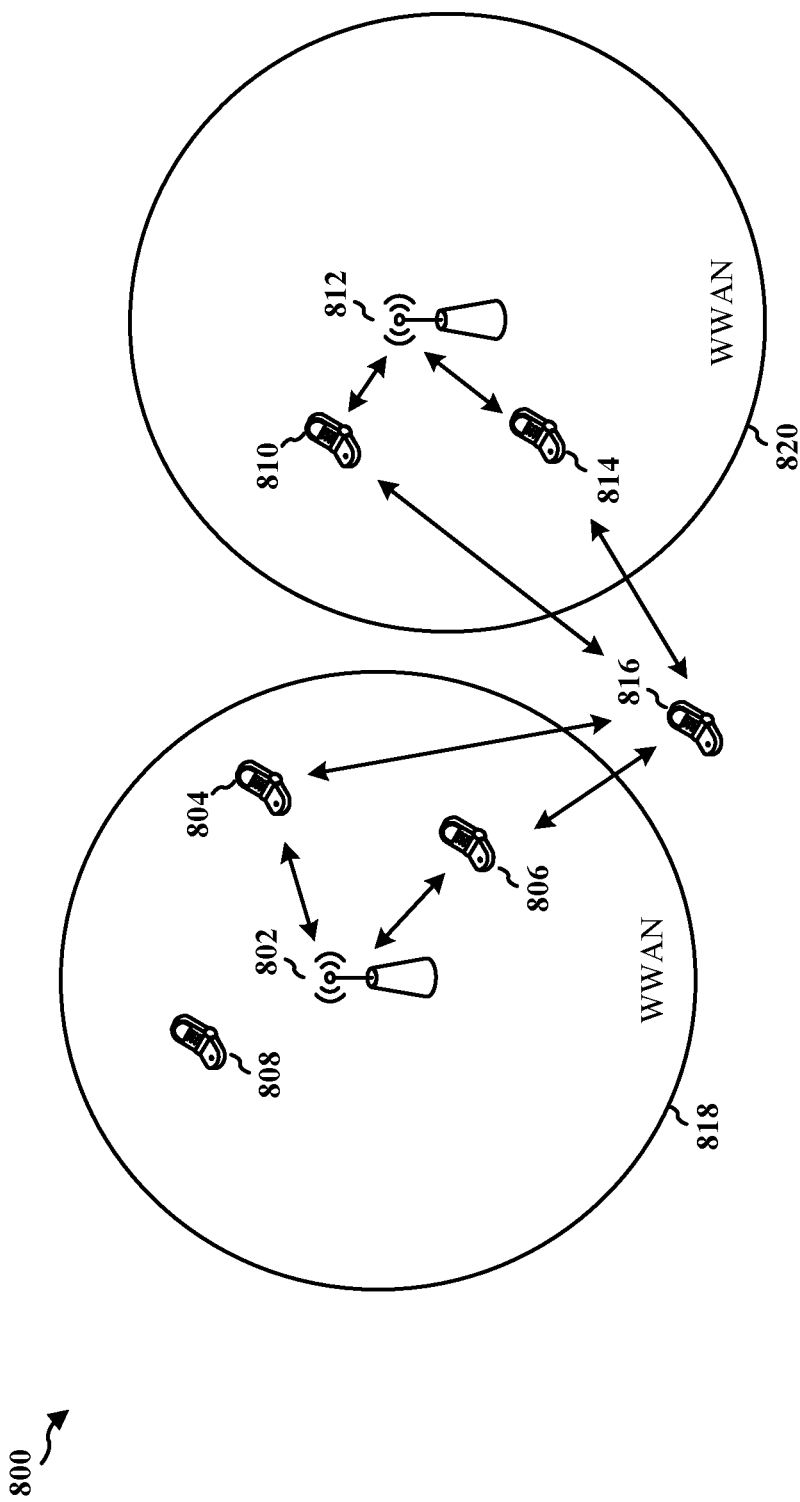
FIG. 4 is a diagram illustrating a communication system.

FIG. 4 is a diagram illustrating a communication system 800. The communication system 800 includes base station 802 and a plurality of UE's such as wireless devices 804, 806, 808 that may be in the communication with base station 802. Communication system 800 also includes a base station 812 and another plurality of UE's such as wireless devices 810, 814 that may be in communication with base station 812. One UE, wireless device 816, may not be in a coverage area 818, 820. For example, wireless device 816, may be outside of a coverage area 818, 820, may move out of a coverage area 818, 820, or may otherwise be unable to communicate with either of base station 802 or base station 812.

As illustrated in FIG. 4, when the wireless device 816 is not in a coverage area, the wireless device 816 may make use of a relay. The relay may allow for the wireless device 816 to begin communication with a network, e.g., communication system 800, when the wireless device 816 is not in the coverage area 818, 820 or to continue a communication with the network when the wireless device 816 moves outside of the coverage areas 818, 820. For example, wireless devices 804, 806, 808, 810, 814 may act as relays. Accordingly, wireless devices 804, 806, 808, 810, 814 are potential relays for wireless device 816 because none of the wireless devices 804, 806, 808, 810, 814 have been selected as a relay for wireless device 816 yet.

Wireless devices 804, 806, 808 may act as relays to base station 802 because they are in coverage area 818 for base station 802. Wireless devices 810 and 814 may act as relays to base station 812 because they are in coverage area 820 of base station 812. Accordingly, wireless device 816 may communicate with the base station 802 through one of the wireless devices 804, 806, or 808. Similarly, wireless device 816 may communicate with the base station 812 through one of the wireless devices 810 or 814.

In some examples, the wireless device 816 may form a Proximity-based Service (ProSe) UE-to-Network relay node. ProSe communication allows wireless devices 804, 806, 808, 810, 814, 816 to communicate directly with each other when two wireless devices 804, 806, 808, 810, 814, 816 are in proximity. With ProSe communications, wireless devices 804, 806, 808, 810, 814, 816 do not need to transmit data, receive data, transmit control signals, receive control signals, or some combination of these with the other wireless devices 804, 806, 808, 810, 814, 816 through a base station, e.g., eNB. Rather, a direct communication link may be formed between, for example, two of wireless devices 804, 806, 808, 810, 814, 816. Thus, direct links between the wireless devices 804, 806, 808, 810, 814, 816 may be formed.

In some examples, relay selection and management may be done in a UE-centric manner. Performing relay selection in a UE-centric manner may be when wireless device 816 autonomously selects/reselects the wireless device 804, 806, 808, 810, or 814 that acts as the relay. In other examples, relay selection and management may be done in an eNodeB-centric manner. In some examples, performing relay selection in an eNB centric manner is when the eNB, e.g., base station 802 or 812, manages the wireless device 804, 806, 808, 810, or 814 that acts as the relay for wireless device 816. Wireless device 816 may be a device that needs to access a base station 802, 812 through a relay device, such as another wireless device 804, 806, 808, 810, 814. Wireless device 816 may generally be outside or at the edge of the coverage area 818, 820.

Generally, the systems, methods, and devices described herein may use an eNodeB-centric approach. It will be understood, however, that the systems, methods, and devices described herein or aspects of these systems, methods, and devices may also generally function in a UE-centric manner. With the UE-centric manner, various functions related to the systems and methods described herein may be moved from the base stations to the UE.

In one example of a relay search, wireless device 816 broadcasts a relay search message, e.g., a discovery message, announcing that wireless device 816 is looking for a relay device. The message may include the Level 2 (L2) identification (ID) of the wireless device 816.

The relay UEs, e.g., wireless devices 804, 804, 808, 810, 814, that listen to the message may inform their respective base station 802, 812, various parameters about wireless device 816. The parameters of wireless device 816 may include but are not limited to, the L2 ID or UE ID of wireless device 816, the D2D-link quality, and any other pertinent information with respect to wireless device 816 or the establishment of a relay for wireless device 816. For example, wireless devices 804, 806, 808 may inform base station 802 the L2 ID or UE ID of wireless device 816 the D2D-link quality, and any other pertinent information. Wireless devices 810, 814 may inform base station 812 the L2 ID or UE ID of wireless device 816 the D2D-link quality, and any other pertinent information. In some examples, the information sent to the respective base station 802 or 812 may be sent via an access link (Uu). As illustrated in FIG. 4, the wireless devices 804, 806, 808, 810, 814 that may act as a relay UE in the illustrated example of FIG. 4, may be served by different base stations 802, 812. For example, base station 802 generally serves wireless devices 804, 806, 808 and base station 812 generally serves wireless devices 810, 814. The service area of base station 802 is illustrated by a circle. The services area of base station 812 is illustrated by coverage area 818. The circles indicate coverage areas 818, 820 are only intended to indicate an example service area generally. It will be understood that any actual service area may not be so clearly delineated. The size and shape of the area of service may vary based on several factors. These factors may include the direction from the base station 802, 812 antenna(s), differences in terrain, differences in antenna signal response, and any other factor that may impact transmission distance or reception distance.

The base station 802, 812 may select the wireless device 804, 806, 808, 810, 814 to act as the relay. More particularly, the base station 802 may select one of the wireless devices 804, 806, 808. The base station 812 may select one of the wireless devices 810, 814 to act as the relay. The selection criteria used for the selection of one of the wireless devices 804, 806, 808 by base station 802 and the selection of one of the wireless devices 810, 814 by base station 812 may include, but are not limited to the potential relay's Uu link quality, D2D-link quality, and other factors related to link quality.

The base station 802 may inform the selected relay UE (one of the wireless devices 804, 806, 808) to initiate a relay-association procedure with wireless device 816. Similarly, the base station 812 may inform the selected relay UE (one of the wireless devices 810, 814) to initiate a relay-association procedure with wireless device 816.

Wireless device 816 may respond to the relay association message(s) by positively acknowledging one of them. For example, assume that wireless device 806 has been selected by wireless device 816 to act as a relay. Wireless device 816 may respond to the relay association message from the wireless device 816 by positively acknowledging the relay association message from wireless device 816, i.e., by sending an acknowledge message back to wireless device 816. In some examples, a ProSe function may be used. When the ProSe function is used, wireless device 816 may also assign a unique relay ID. The unique relay ID may be used later when wireless device 816 comes back to an area with coverage. An area with coverage may include areas where wireless device 816 can communicate with a base station 802, 812, directly.

In the example illustrated in FIG. 4, multiple association messages are possible. For example, wireless device 816 may receive an association message from wireless device 806 (served by base station 802) and wireless device 814 (served by base station 812). The association messages may be sent when the relay UEs, e.g., wireless devices 804, 806, 808, 810, 814, are served by different base stations 802, 812. Wireless device 816 may choose the relay based on one or more of PLMN IDs of the relay, backhaul quality, D2D-link quality, or other quality factors.

In some examples, wireless device 816 may explicitly decline the non-selected wireless devices, i.e., the potential relay(s) not selected to act as a relay for wireless device 816. Accordingly, wireless device 816 may transmit a message to wireless device 814 when wireless device 814, which has transmitted an association message, is not selected to be the relay for wireless device 816.

In other examples, wireless devices 814 that are not selected to be a relay or the relay association request may time-out on their own. Accordingly, in some examples, wireless device 816 does not explicitly decline the non-selected wireless devices 814, i.e., the potential relay(s) not selected to act as a relay for wireless device 816. In either of these cases, wireless device 814 may then send a message (SLUEInfo) indicating Stop of relay link to its serving base station.

In some examples, base station 802 may configure wireless device 806, the relay UE in this example, for periodically reporting on the link quality. The link quality reported may be for the link between wireless device 816 and wireless device 806. The link quality may be for the link between wireless device 806 and base station 802. The link quality may be for the overall link quality between base station 802 and wireless device 816 (through relay UE, wireless device 806). In another example, the link quality may be some combination of these examples. The wireless device 806 may, in turn, configure the wireless device 816 to transmit a signal periodically. The signal periodically transmitted by the wireless device 816 may be used to measure the UE-relay link quality. The signal may be, for example, a pilot signal. The measure of link quality may be based on the pilot signal. In some examples, the signal may be part of a relay search message. Additionally, the pilot signal may be part of a relay search message. Alternatively, the pilot signal may be part of some other message or signal. In other examples, such configuration may be done during the relay association phase.

In an example, the base station 802 may send a measurement request to the wireless device 816, the relay UE, to report the UE-relay link quality in a non-periodic manner. The message requesting that the wireless device 816 report the UE-relay link quality may be sent using dedicated signaling. In another example, the base station 802 may configure not just the wireless device 806, but other potential relay UEs, such as wireless devices 804, 808 that are not currently associated with wireless device 816.

In some examples, configuring the wireless device(s) 804, 806, 808 may be done explicitly. Explicit configuring may be performed by selecting the relays that were able to listen to the relay solicitation message. In another example, configuring the wireless device(s) 804, 806, 808 may be done implicitly. Implicit selection may be performed when a relay UE receives the related relay search message from the wireless device 816 in a manner the same or similar to the solicitation message.

In an example, the base station 802 may also configure the wireless device 616 for periodically reporting its Uu link quality via the wireless device 806, which is the relay UE in the example of FIG. 4. The Uu link quality measurement may be used to allow for a seamless transition from direct communications between a base station 802, 812 and a wireless device 804, 806, 808, 810, 814, 816 and relay communications between a base station 802, 812 and a wireless device 804, 806, 808, 810, 814, 816 through another wireless device 804, 806, 808, 810, 814, 816. Transitions may be from direct communications to relay communications or from relay communications to direct communications. In some examples, the base station 802 may use measurements of the Uu link of the relay via a legacy procedure.

In some examples, in response to a measurement request, a periodic measurement reporting configuration, or both, wireless device 810, which is the relay UE may send a message (SLUEInfo) to the base station informing the base station of the wireless device 816's UE ID and the D2D-link quality via Uu. In another example, the message (SLUEInfo) may also include the Uu quality of the wireless device 816.

In some examples, the base station 802 may use the measurement reports to decide to move the relay link from one relay UE, e.g., wireless device 806 to another UE, e.g., wireless device 804, or instruct the wireless device 816, (via the associated relay UE) to reinitiate the relay association process.

Figure 5:
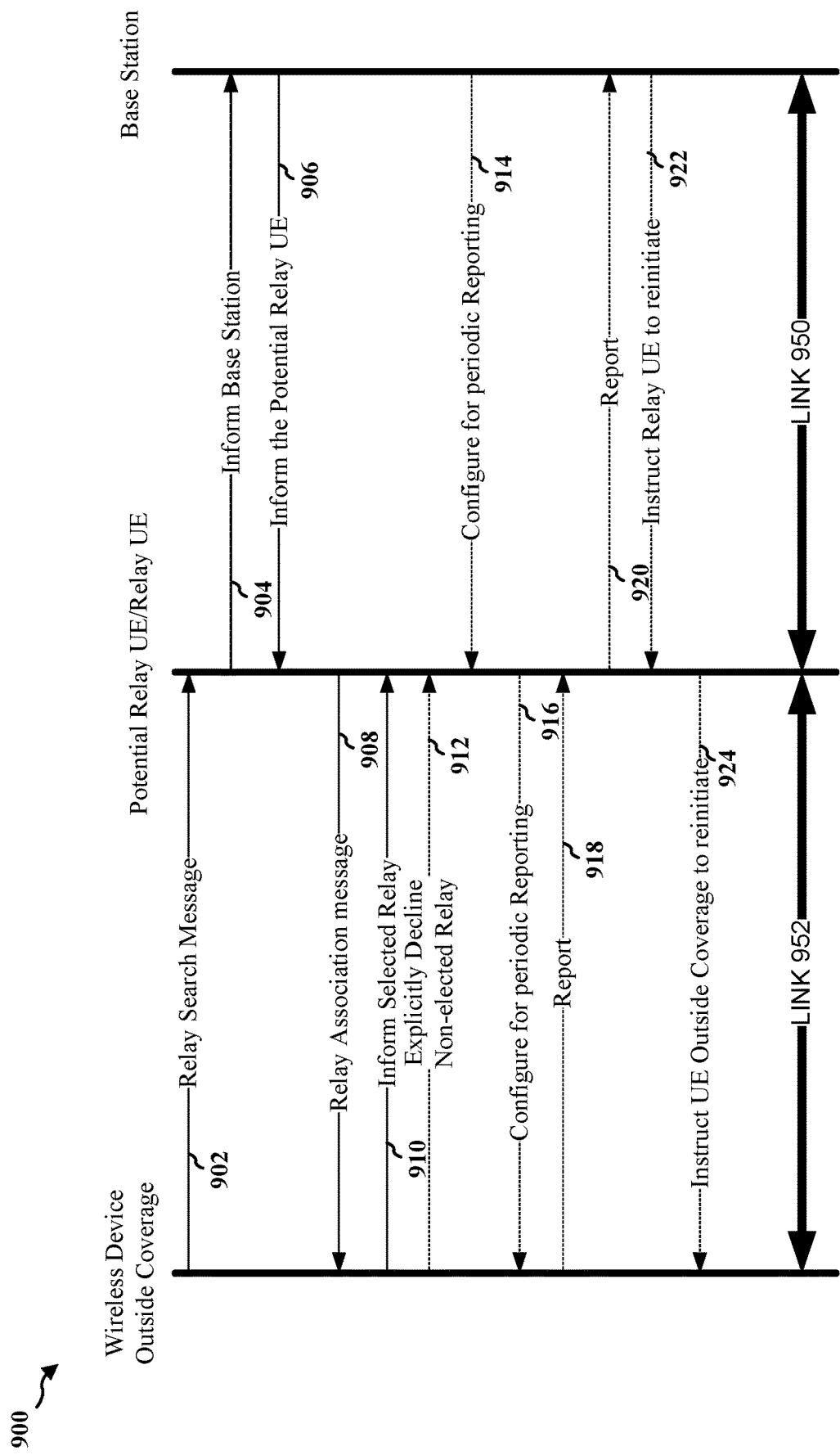
FIG. 5 is a diagram illustrating signals sent between different communication devices.

FIG. 5 is a diagram 900 illustrating signals sent between different communication devices. The signals may be transmitted and received by a wireless device outside of the coverage area, a wireless device that is a potential relay, a base station, or some combination of these. As described above, the wireless device outside the coverage areas may make use of a relay to communicate with a base station. In the example of FIG. 5, the wireless device outside the coverage areas broadcasts a relay search message, e.g., a discovery message, announcing that the wireless device outside the coverage area is looking for a relay device 902. Based on the relay search message, each of the potential relays, wireless devices that might be a relay, inform their base station(s) 904.

The base station(s) may then select relay(s) to send relay association message(s). The relay association message(s) may be sent to the wireless device outside the areas of coverage. Generally, one relay per base station may send a relay association message to the wireless device outside the coverage area, for relays within range of the wireless device outside the coverage area 906. Accordingly, the base station(s) may inform the selected wireless device(s) to initiate a relay-association procedure with the wireless device outside the coverage areas 906. The potential relay(s) may transmit relay association messages to the wireless device outside of the coverage area 908. The wireless device outside the coverage areas may respond to the relay association message(s) by positively acknowledging one of the relay association messages 910. In some examples, the wireless device outside the areas of coverage may explicitly decline the non-selected wireless devices 912. In other examples, wireless devices that are not selected to be a relay may time-out on their own. More specifically, it may be the relay association request that times-out.

In some examples, the base station may configure the selected relay wireless device or relay UE for periodically reporting on the link quality 914. The link quality reported may be for the link 950, the link 952, for the overall link (link 950 and link 952 together along with any change in quality through a processing device). In some example, two or more of link 950 quality, link 952 quality, overall link quality (including changes through any of the devices) may be reported.

The relay device may, in turn, configure the wireless device outside of the coverage areas to transmit a signal periodically by sending a message 916. The periodically transmitted signal may be used to measure the UE-relay link quality. The signal may be, for example, a pilot signal and the measure of link quality may be based on the pilot signal.

After being configured for periodic reporting, the wireless device outside of the coverage area(s) and the relay device may report link quality to the base station 918, 920. The base station may use this information to determine if another device should be used as the relay device. The base station may then instruct the relay UE to reinitiate the relay association and the relay UE may send a message to instruct the UE outside of the coverage area to reinitiate coverage.

The UE may receive a message from the base station in response to the second UE-to-relay link quality. The message may instruct the second UE to reinitiate a relay search procedure 922. Reinitiating the relay search procedure may include transmitting another relay search message.

Additionally, the UE may transmit a message to the second UE instructing the second UE to reinitiate the relay search procedure 924. The second UE may perform another search procedure base on this message. Generally the UE may transmit a message to the second UE instructing the second UE to reinitiate the relay search procedure when the base station determines that signal quality is too low, such as below a predetermined threshold. The link quality compared to such a threshold may be the link quality from the second UE-to-relay, the link quality from the relay to the base station, the link quality from the second UE to the base station, or one or more of these.

Figure 6A:
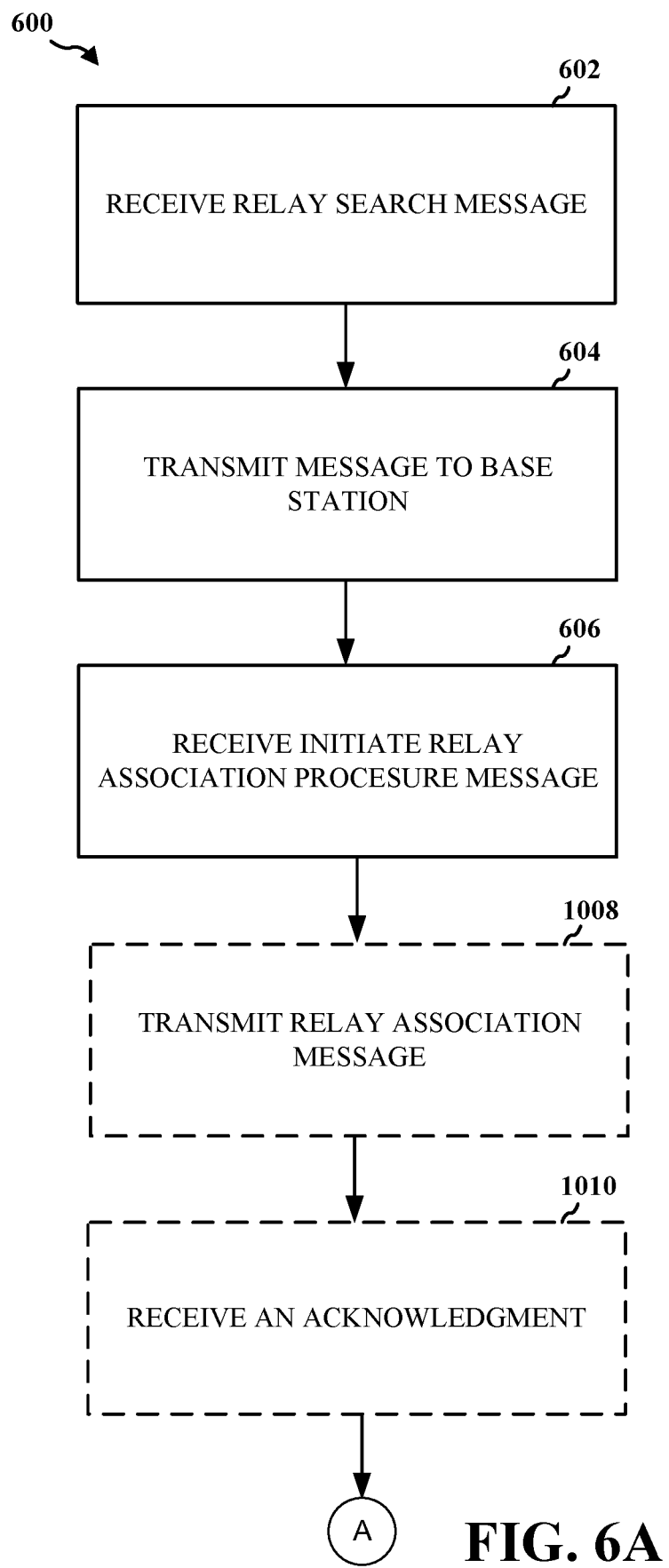
FIGS. 6A-6C are a flowchart illustrating a method of wireless communication.
Figure 6B:
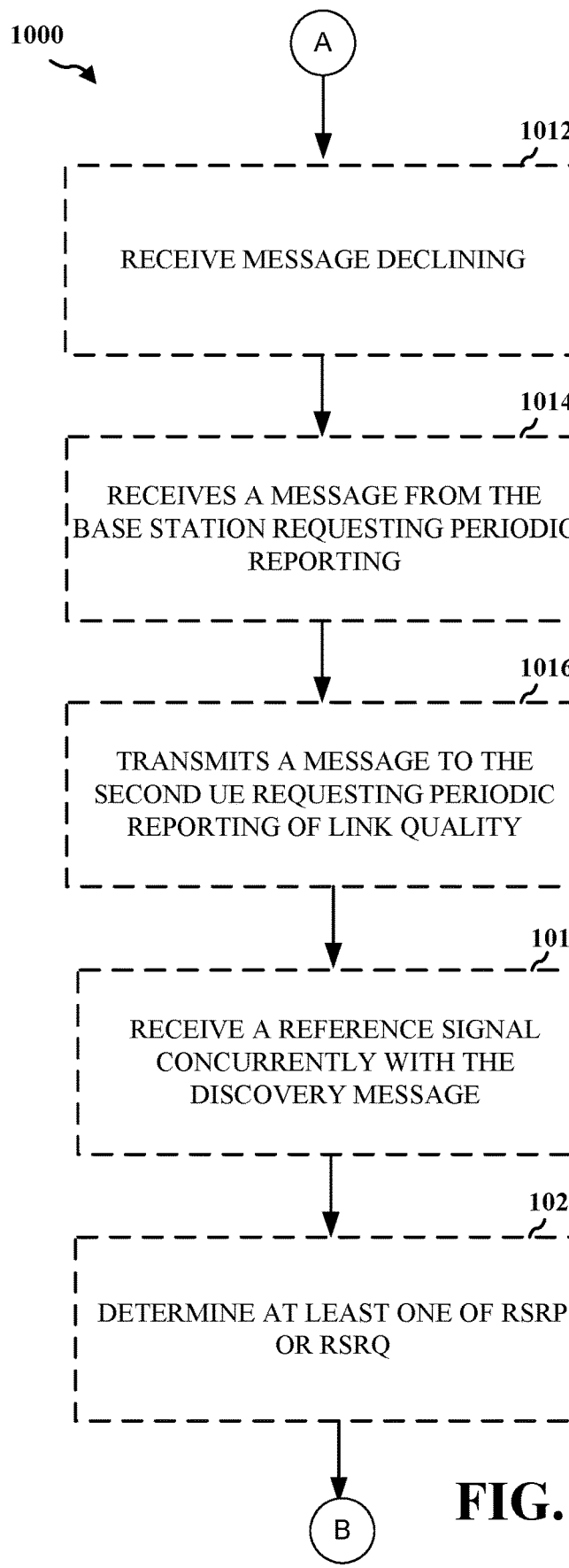
Figure 6C:
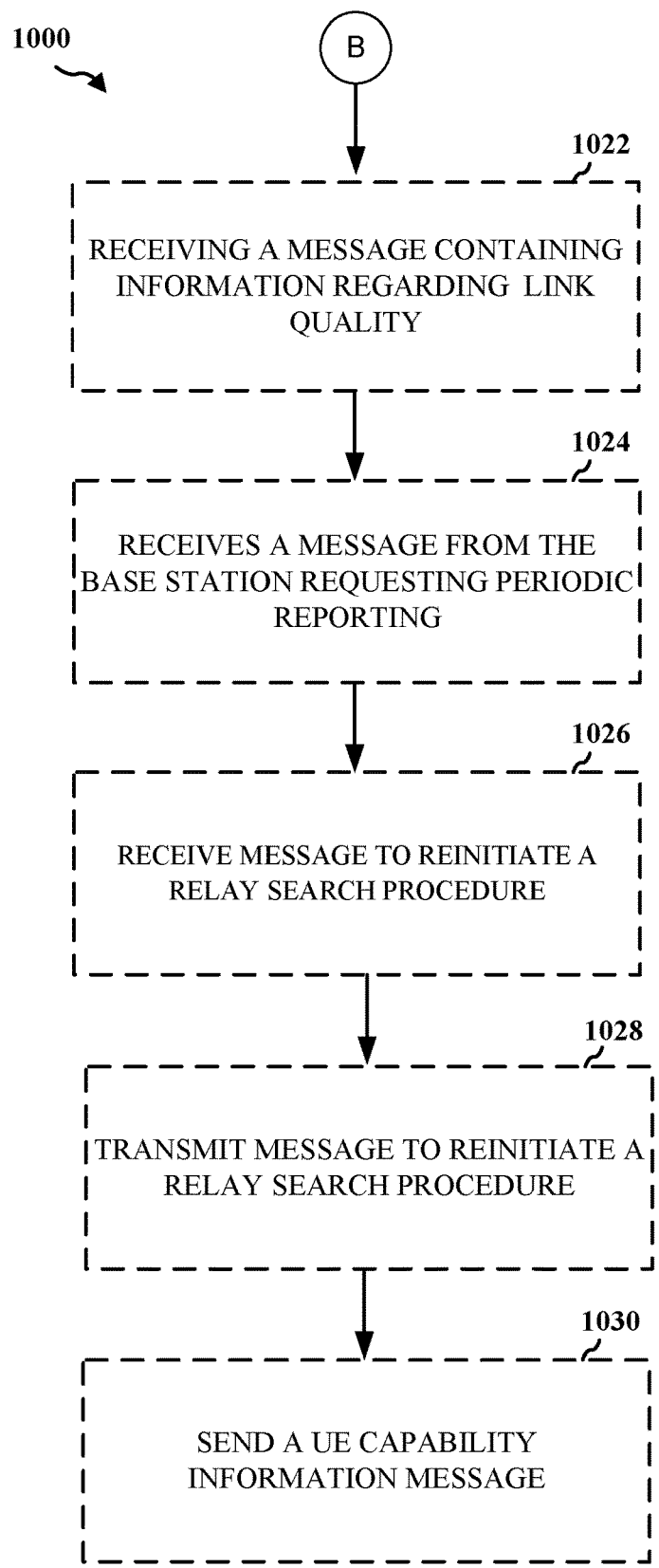

FIGS. 6A-6C are a flowchart 1000 illustrating a method of wireless communication. The method may be performed by a UE (e.g., wireless device 806 of FIG. 4). At 1002, the UE (wireless device 806) receives a relay search message (902). The relay search message may be from a second UE, wireless device 816, which is not in a coverage area 818, 820. Additionally, the relay search message may request a relay UE (wireless device 806) to establish a connection to the wireless communications network. The connection may be through the relay UE, wireless device 806.

At 1004, the UE, wireless device 806, transmits a message to the base station 802 (904). The message informs the base station 802 of the relay search message from the second UE, wireless device 816. The base station may then select a potential relay (wireless device 806 for base station 802 and wireless device 814 for base station 812) and inform the potential relay that the relay has been selected. The base station 802, 812 may also instruct the selected relay that the selected relay should perform a relay association procedure.

At 1006, the UE, wireless devices 806, 814 receives an initiate relay association procedure message from the base station 802, 812 (906). The relay association procedure message informs the first UE, wireless device 806, 814 that the first UE has been selected by the base station 802, 812 to initiate a relay association procedure with the second UE, wireless device 816.

At 1008, the UE, wireless device 806, 814 may transmit a relay association message to the second UE, wireless device 816 (908). The relay association message may include a request to be the relay UE for the second UE. The relay association message informs the second UE that a particular device, the device sending the relay association message, has been selected by a base station 802, 812 as a possible relay device for the second UE. Multiple UE's, wireless devices 806, 814 may transmit a relay association message, generally one per base station 802, 812.

At 1010, the UE, wireless device 806, may receive an acknowledgment from the second UE, wireless device 806 (910). The acknowledgment from the second UE may indicate that the second UE has selected the first UE, wireless device 806, as the relay device. Thus, for example, wireless device 816 of FIG. 4 may send an acknowledgment to wireless device 806.

At 1012, the UE, wireless device 814, may receive a message from the second UE, wireless device 816, declining the request from the first UE, wireless device 814, to be the relay for the second UE (912). This step is optional. In some examples, no message from the second UE declining the request from the first UE to be the relay for the second UE is sent.

At 1014, the UE, wireless device 806, receives a message from the base station 802 requesting periodic reporting (914). Periodic reporting allows the base station to keep track of link quality for wireless devices communicating over a relay wireless device. The periodic reporting may be of the link quality from the second UE-to-relay, the link quality from the relay to the base station, the link quality from the second UE to the base station, or one or more of these.

At 1016, the UE transmits a message to the second UE requesting periodic reporting of link quality (916). Again, the periodic reporting may be of the link quality from the second UE-to-relay, the link quality from the relay to the base station, the link quality from the second UE to the base station, or one or more of these. The link quality may be based on the message from the base station requesting periodic reporting of second UE-to-relay link quality. The request may include a request for a periodic transmission of a ProSe channel for measurement of the UE-to-relay link quality.

At 1018, the UE, wireless device 806, may receive a reference signal concurrently with the discovery message (916). In some examples, the message may be concurrent with a ProSe measurement channel. The reference signal or ProSe measurement channel may be used to measure signal quality.

At 1020, the UE may determine at least one of a reference signal received power (RSRP) or a reference signal received quality (RSRQ) based on the received reference signal. A message may be transmitted to the base station. The message to the base station may include at least one of the determined RSRP or RSRQ.

At 1022, the UE may receive a message containing information regarding link quality in response to the message to the second UE requesting periodic reporting of second UE-to-relay link quality (918). As discussed above, the periodic reporting may be of the link quality from the second UE-to-relay, link quality from the relay to the base station, link quality from the second UE to the base station, or one or more of these. Generally, the UE may receiving a message containing information regarding link quality between the second UE and the relay UE because the base station may already know signal quality between the UE and the base station because the UE and the base station are communicating directly.

At 1024, the UE may transmit a message to the base station including information regarding link quality such as second UE-to-relay link quality based on a message containing information regarding second UE-to-relay link quality received from the second UE (920). As discussed above, however, the periodic reporting may be of the link quality from the second UE-to-relay, link quality from the relay to the base station, link quality from the second UE to the base station, or one or more of these.

At 1026, the UE may receive a message from the base station in response to the second UE-to-relay link quality. The message may instruct the second UE to reinitiate a relay search procedure (922). Reinitiating the relay search procedure may include transmitting another relay search message.

At 1028, the UE may transmit a message to the second UE instructing the second UE to reinitiate the relay search procedure (924). The second UE may perform another search procedure base on this message. Generally the UE may transmit a message to the second UE instructing the second UE to reinitiate the relay search procedure when the base station determines that signal quality is too low, such as below a predetermined threshold. The link quality compared to such a threshold may be the link quality from the second UE-to-relay, the link quality from the relay to the base station, the link quality from the second UE to the base station, or one or more of these.

At 1030, the UE may send a UE capability information message to the base station (920). The capability information message may inform the base station of various capabilities of the UE, e.g. a number of UEs that can simultaneously be supported by this relay UE, relay UE's capability of relaying MBMS traffic, etc. The capability information message may indicate at least one of UE relay capabilities at the first UE or relay capacity supported at the first UE, for example. Based on relay capability, the eNB can configure the RSRP threshold or send commands to the relay UE to indicate when the relay UE should start transmission of a discovery message to assist relay discovery and selection. In this message (that can be RRC message) the eNB can instruct the relay UE to act only for certain list of groups represented by group IDs.

Figure 7:
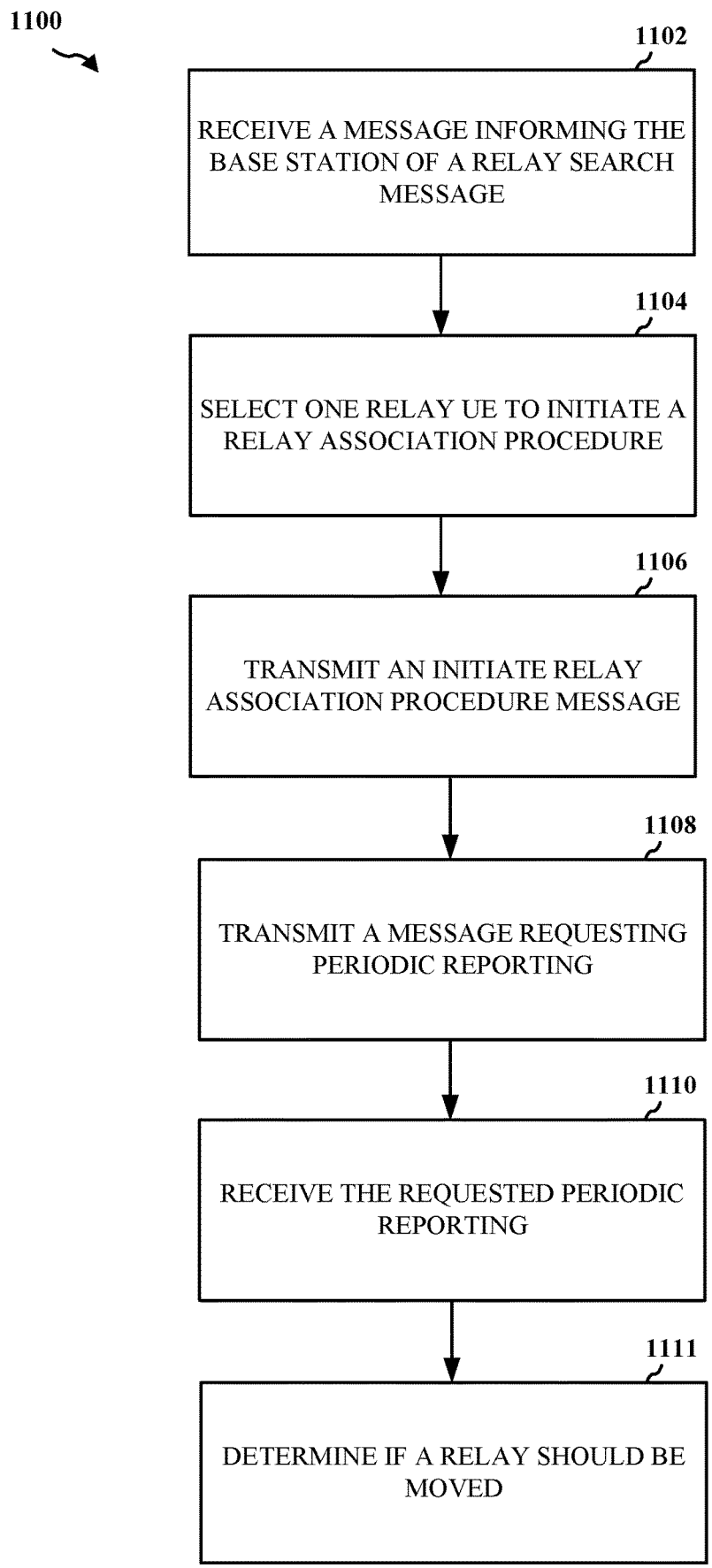
FIG. 7 is another flowchart illustrating a method of wireless communication.

FIG. 7 is another flowchart 1100 illustrating a method of managing a relay connection in a wireless communications network at a base station 802, 812. The method may be performed by a base station, eNB (e.g., the base station 802 of FIG. 4). At 1102, the base station 802, 812 receives a message from at least one relay UE informing the base station 802, 812, of a relay search message from a first UE, e.g., wireless device 814 (904).

At 1104, each base station 802, 812 selects one relay UE (e.g., wireless device 806, 814, respectively) of the at least one relay UEs to initiate a relay association procedure. In some examples, the selection may be based on at least one of direct link quality between the relay UE, e.g., wireless device 816, and first UE, e.g., wireless device 814, access link quality between the relay UE, e.g., wireless device 814, and the base station 802, 812, or a combination of direct link quality between the relay UE and first UE, e.g., wireless device 814, access link quality between the relay UE, e.g., wireless device 814, and the base station 802, 812.

At 1106, the base stations 802, 812 each transmit an initiate relay association procedure message to the one relay UE, e.g., wireless device 814 (906). The initiate relay association procedure message informs the one relay UE, e.g., wireless device 814 that the one relay UE, e.g., wireless device 814, has been selected by the base station 802, 812 to initiate a relay association procedure.

At 1108, the base station 802, 812 transmits a message to the selected relay UE, e.g., wireless device 814, requesting periodic reporting of second UE-to-relay link quality (914). In some examples, the signal quality may be from the base station 802 to the wireless device 806 acting as the relay. In some examples, the signal quality may be from the wireless device 806 to wireless device 816. In some examples, the signal quality may be from base station 802 to wireless device 816 through wireless device 806.

At 1110, the base station 802, 812 receives the requested periodic reporting of second UE-to-relay link quality (920). The quality information may be used for various purposes, such as determining if the relay used should be changed.

At 1112, the base station 802, 812 determines if a relay for the second UE should be moved to another relay UE, e.g., wireless device 814, based on the signal quality determined through the requested periodic reporting of the second UE-to-relay link quality. The base station 802, 812 may then instruct a relay UE, e.g., wireless device 814, to reinitiate (922).

Figure 8:
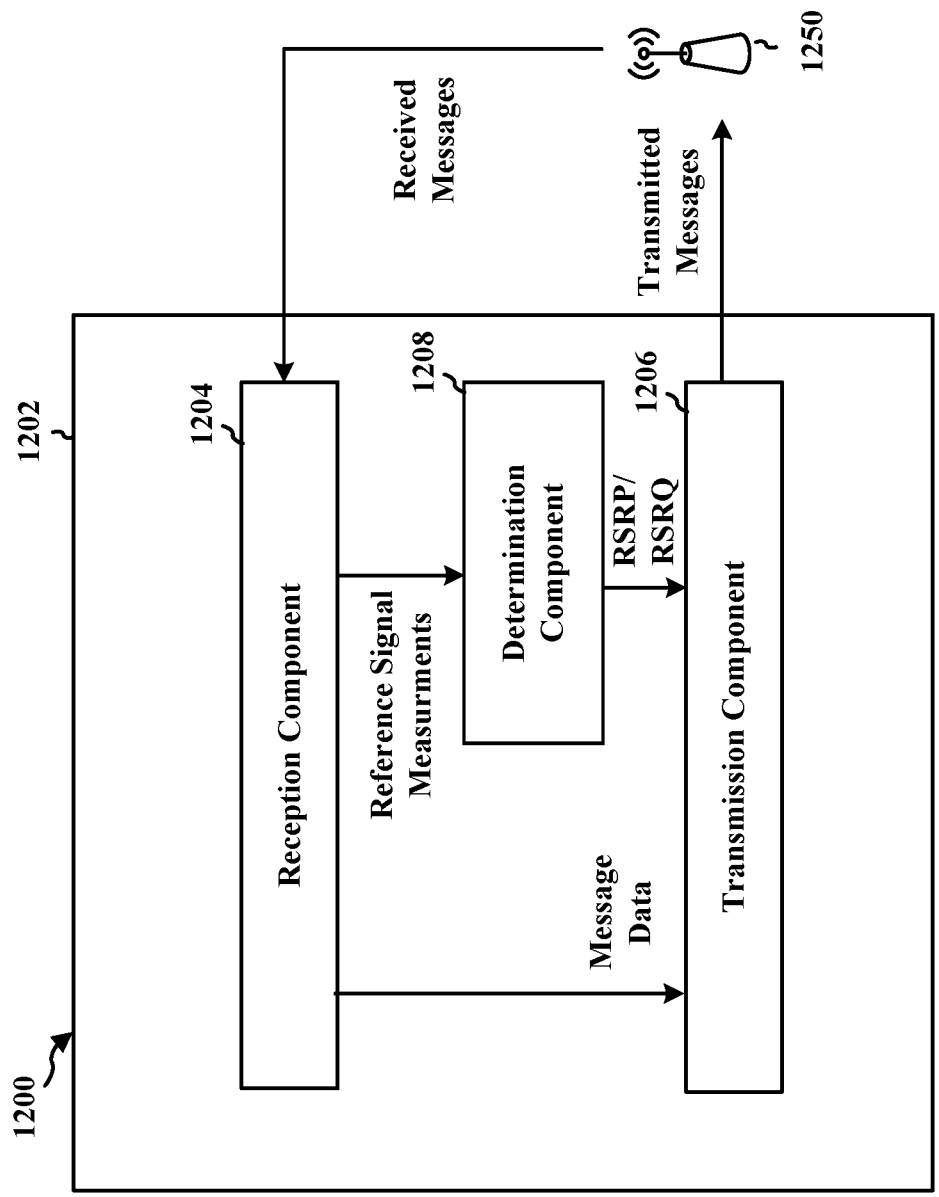
FIG. 8 is a conceptual data flow diagram illustrating the data flow between different means/components in an exemplary apparatus.

FIG. 8 is a conceptual data flow diagram 1200 illustrating the data flow between different means/components in an exemplary apparatus 1202. The apparatus may be a UE or an eNB. The apparatus includes a component 1204 that may receive various messages. The messages may include data messages and reference signals. The component 1204 may receive relay search messages, initiate relay association procedure messages, acknowledgments, messages from a UE declining a request, reference signals, discovery messages, messages requesting periodic reporting, messages containing information regarding link quality, or messages in response to link quality instructions, ProSe measurement channel messages. The apparatus also includes a component 1206 that may transmit various messages. The messages may include messages informing a base station of a relay search message from a UE, relay association messages, messages sending UE capability information, messages instructing to reinitiate a relay search procedure, messages including information regarding UE-to-relay link quality including at least one of the determined RSRP or RSRQ, messages instructing to reinitiate a relay search procedure, or messages to the second UE requesting a periodic transmission of a ProSe channel for measurement of the UE-to-relay link quality. A message quality determination component 1208 may make various determinations with respect to the message quality. For example, the determination component may determine at least one of an RSRP or an RSRQ based on the received reference signal, which may be received by the receive component 1204 and passed to the determination component 1208. The component 1208 may send data such as RSRP and/or RSRQ, to the component 1206 related to the determinations made by the component 1208, e.g., determinations of at least one of an RSRP or an RSRQ based on the received reference signal. The component 1204 may send message data to the component 1206. For example, the component 1204 may send received data to the component 1206 so that the received data may be transmitted.

The apparatus may include additional components that perform each of the blocks of the algorithm in the aforementioned flowcharts of FIGS. 6A-6C and 8. As such, each block in the aforementioned flowcharts of FIGS. 6A-6C and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
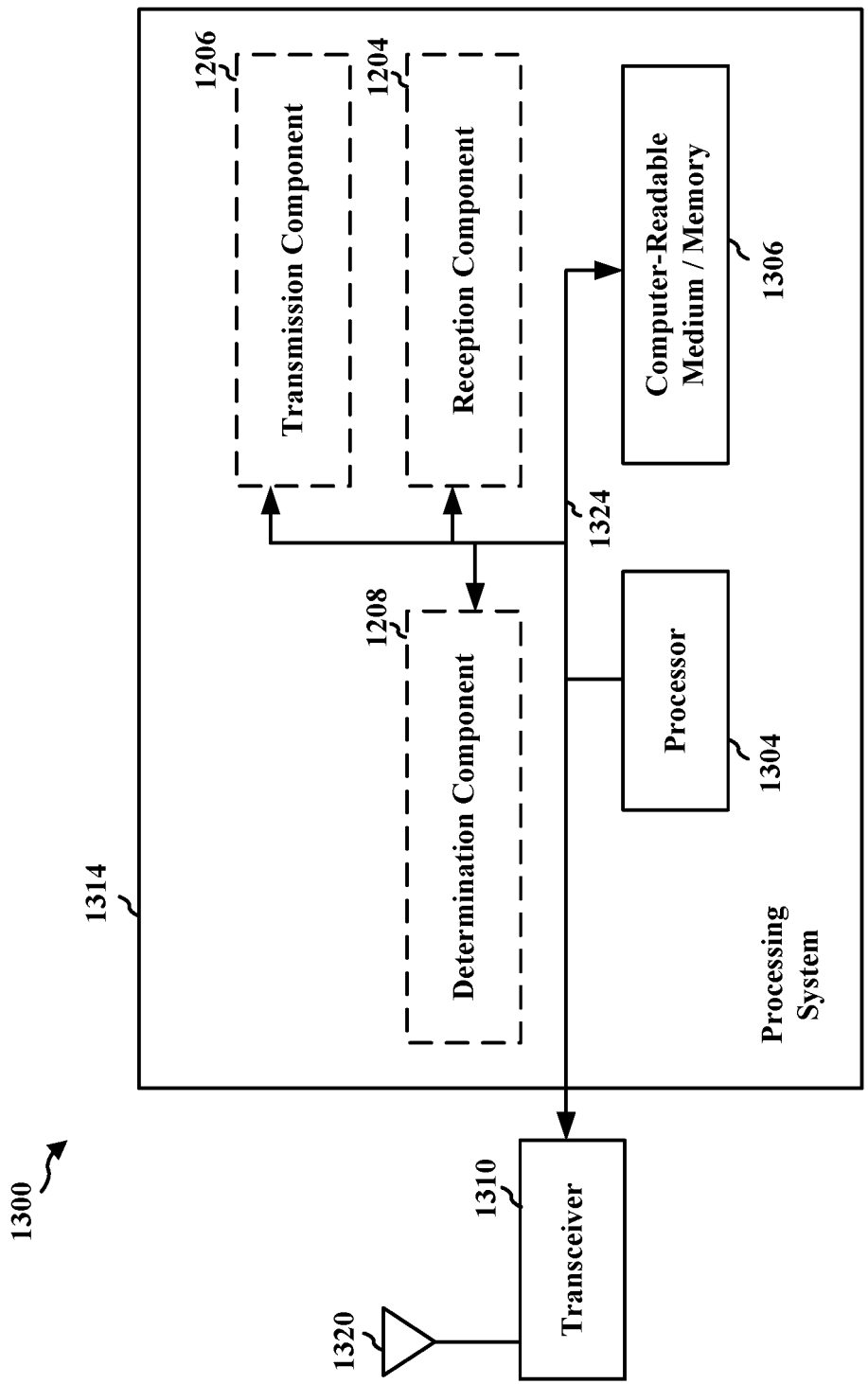
FIG. 9 is a diagram illustrating an example of a hardware implementation for an apparatus employing a processing system.

FIG. 9 is a diagram 1300 illustrating an example of a hardware implementation for an apparatus 1202 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component receive a relay search message from a second UE requesting a relay UE to establish a connection to the wireless communications network through the relay UE, receive an initiate relay association procedure message from the base station, the initiate relay association procedure message informing the first UE that the first UE has been selected by the base station to initiate a relay association procedure with the second UE, or receive a message from at least one relay UE informing the base station of a relay search message from a first UE;

In addition, the transceiver 1310 receives information from the processing system 1314, specifically the transmission component may transmit a message to a base station informing the base station of the relay search message from the second UE, transmit a relay association message to the second UE including a request to be the relay UE for the second UE, or transmit an initiate relay association procedure message to the one relay UE, the initiate relay association procedure message informing the one relay UE that the one relay UE has been selected by the base station to initiate a relay association procedure and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The processor 1304 may select one relay UE of the at least one relay UEs to initiate a relay association procedure. The computer-readable medium/memory 1306 may also be used for storing data that is manipulated by the processor 1304 when executing software. The processing system 1314 further includes at least one of the components 1204, 1206, 1208. The components may be software components running in the processor 1304, resident/stored in the computer readable medium/memory 1306, one or more hardware components coupled to the processor 1304, or some combination thereof. The processing system 1314 may be a component of the eNB 310 and may include the memory 376 and/or at least one of the TX processor 316, the RX processor 370, and the controller/processor 375. The processing system 1314 may be a component of the UE 350 and may include the memory

360 and/or at least one of the TX processor 368, the RX processor 356, and the controller/processor 359.

In one configuration, the apparatus 1202 for wireless communication includes means for receiving a relay search message from a second UE requesting a relay UE to establish a connection to the wireless communications network through the relay UE. Additionally, the apparatus 1202 for wireless communication includes means for transmitting a message to a base station informing the base station of the relay search message from the second UE. Additionally, the apparatus 1202 for wireless communication includes means for receiving an initiate relay association procedure message from the base station. Further, the apparatus 1202 for wireless communication may include means for transmitting a relay association message to the second UE including a request to be the relay UE for the second UE.

In one configuration, the apparatus 1202 for wireless communication may include means for sending a UE capability information message to the base station indicating at least one of UE relay capabilities at the first UE or relay capacity supported at the first UE. In one configuration, the apparatus 1202 for wireless communication may include means for receiving an acknowledgment from the second UE indicating that the second UE has selected the first UE as the relay device. In one configuration, the apparatus 1202 for wireless communication may include means for receiving a message from the second UE declining the request from the first UE to be the relay for the second UE. In one configuration, the apparatus 1202 for wireless communication may include means for receiving a reference signal concurrently with the discovery message and means for determining at least one of an RSRP or an RSRQ based on the received reference signal. In one configuration, the apparatus 1202 for wireless communication may include means for receiving a message from the base station requesting periodic reporting of second UE-to-relay link quality and means for transmitting a message to the second UE requesting periodic reporting of second UE-to-relay link quality based on the message from the base station requesting periodic reporting of second UE-to-relay link quality. In one configuration, the apparatus 1202 for wireless communication may include means for receiving a message containing information regarding second UE-to-relay link quality from the second UE in response to the message to the second UE requesting periodic reporting of second UE-to-relay link quality and means for transmitting a message to the base station including information regarding second UE-to-relay link quality based on the message containing information regarding second UE-to-relay link quality received from the second UE. In one configuration, the apparatus 1202 for wireless communication may include means for receiving a message from the base station in response to the second UE-to-relay link quality instructing the second UE to reinitiate a relay search procedure. In one configuration, the apparatus 1202 for wireless communication may include means for transmitting a message to the second UE instructing it to reinitiate the relay search procedure. In one configuration, the apparatus 1202 for wireless communication may include means for receiving a reference signal concurrently with a ProSe measurement channel. In one configuration, the apparatus 1202 for wireless communication may include means for determining at least one of an RSRP or an RSRQ based on the received reference signal. In one configuration, the apparatus 1202 for wireless communication may include means for transmitting a message to the base station including information regarding second UE-to-relay link quality including at least one of the determined RSRP or RSRQ. In one configuration, the apparatus 1202 for wireless communication may include means for receiving a message from the base station in response to the second UE-to-relay link quality instructing the second UE to reinitiate the relay search procedure. In one configuration, the apparatus 1202 for wireless communication may include means for transmitting a message to the second UE instructing it to reinitiate the relay search procedure.

The aforementioned means may be one or more of the aforementioned components of the apparatus 1202 configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In one configuration, the apparatus 1202 for wireless communication includes means for receiving a message from at least one relay UE informing the base station of a relay search message from a first UE. Additionally, the apparatus 1202 for wireless communication includes means for selecting one relay UE of the at least one relay UEs to initiate a relay association procedure. Additionally, the apparatus 1202 for wireless communication includes means for transmitting an initiate relay association procedure message to the one relay UE.

In one configuration, the apparatus 1202 for wireless communication may include means for transmitting a message to the selected relay UE requesting periodic reporting of second UE-to-relay link quality. In one configuration, the apparatus 1202 for wireless communication may include means for receiving the requested periodic reporting of second UE-to-relay link quality. In one configuration, the apparatus 1202 for wireless communication may include means for determining if a relay for the second UE should be moved to another relay UE based on the requested periodic reporting of the second UE-to-relay link quality. The aforementioned means may be one or more of the aforementioned components of the apparatus 1202 configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means. In some examples, the processor 1304 may implement the determination component 1208.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a first user equipment (UE), the first UE comprising a relay UE, the method comprising:
    receiving a relay search message from a second UE requesting the first UE to establish a connection to a wireless communications network through the first UE;
    receiving a first reference signal concurrently with the relay search message from the second UE;
    determining at least one of a reference signal received power (RSRP) or a reference signal received quality (RSRQ) based on the received first reference signal,
    transmitting an initial message to a base station informing the base station of the relay search message from the second UE, wherein the initial message to the base station comprises at least one of the determined RSRP or RSRQ; and
    receiving an initiate relay association procedure message from the base station based on the determined RSRP or RSRQ, the initiate relay association procedure message informing the first UE that the first UE has been selected by the base station to initiate a relay association procedure with the second UE;
    receiving a second reference signal concurrently with a Proximity Services (ProSe) channel for measurement of second UE-to-relay link quality, determining at least one of another RSRP or another RSRQ based on the received second reference signal, and transmitting a subsequent message to the base station including information regarding the second UE-to-relay link quality including at least one of the determined RSRP or RSRQ based on the received second reference signal;
    receiving another message from the base station in response to the second UE-to-relay link quality instructing the second UE to reinitiate the relay search procedure; and
    transmitting a message to the second UE instructing the second UE to reinitiate the relay search procedure.

2. The method of claim 1, further comprising sending a UE capability information message to the base station indicating at least one of UE relay capabilities at the first UE or relay capacity supported at the first UE, the relay capacity including at least one of a number of UEs that can be simultaneously supported or an ability to support an MBMS traffic relay.

3. The method of claim 1, further comprising receiving an acknowledgment from the second UE indicating that the second UE has selected the first UE as the relay device.

4. The method of claim 1, wherein the relay search message from the second UE is a ProSe direct discovery message and includes at least a second UE identification (ID) and the message to the base station comprises the second UE ID.

5. The method of claim 1, wherein the initial message to the base station further includes an indication of link quality associated with an access link between the first UE and the base station.

6. The method of claim 1, wherein the relay association procedure message comprises a radio resource control (RRC) message, the RRC message instructing the first UE to initiate the relay association procedure over a ProSe channel, the RRC message including at least one of a unique relay ID or periodic reporting information.

7. The method of claim 1, further comprising receiving a first message from the base station requesting periodic reporting of second UE-to-relay link quality and transmitting a second message to the second UE requesting the periodic reporting based on the first message.

8. The method of claim 7, further comprising receiving a third message containing information regarding second UE-to-relay link quality from the second UE in response to the second message and transmitting a fourth message to the base station including the information based on the third message.

9. The method of claim 1, wherein the initial message is transmitted over an access link (Uu).

10. The method of claim 1, further comprising receiving a message from the base station requesting periodic reporting of second UE-to-relay link quality and transmitting a message to the second UE requesting a periodic transmission of a ProSe channel for measurement of the UE-to-relay link quality.

11. The method of claim 1, further comprising transmitting a relay association message to the second UE including a request to be the relay UE for the second UE.

12. The method of claim 11, further comprising receiving a message from the second UE declining the request from the first UE to be the relay for the second UE.

13. An apparatus for wireless communication at a first user equipment (UE), the first UE comprising a relay UE, the apparatus comprising:
    a memory; and
    at least one processor coupled to the memory and configured to:
        receive a relay search message from a second UE requesting the first UE to establish a connection to a wireless communications network through the first UE;
        receive a first reference signal concurrently with the relay search message from the second UE;
        determine at least one of a reference signal received power (RSRP) or a reference signal received quality (RSRQ) based on the received first reference signal, transmit an initial message to a base station informing the base station of the relay search message from the second UE, wherein the initial message to the base station comprises at least one of the determined RSRP or RSRQ; and receive an initiate relay association procedure message from the base station based on the determined RSRP or RSRQ, the initiate relay association procedure message informing the first UE that the first UE has been selected by the base station to initiate a relay association procedure with the second UE;

receive a second reference signal concurrently with a Proximity Services (ProSe) channel for measurement of second UE-to-relay link quality, determine at least one of another RSRP or another RSRQ based on the received second reference signal, and transmit a subsequent message to the base station including information regarding the second UE-to-relay link quality including at least one of the determined RSRP or RSRQ based on the received second reference signal;

receive another message from the base station in response to the second UE-to-relay link quality instructing the second UE to reinitiate the relay search procedure; and transmit a message to the second UE instructing the second UE to reinitiate the relay search procedure.

14. The apparatus of claim 13, wherein the at least one processor is further configured to send a UE capability information message to the base station indicating at least one of UE relay capabilities at the first UE or relay capacity supported at the first UE, the relay capacity including at least one of a number of UEs that can be simultaneously supported or an ability to support an MBMS traffic relay.

15. The apparatus of claim 13, wherein the at least one processor is further configured to receive an acknowledgment from the second UE indicating that the second UE has selected the first UE as the relay device.

16. The apparatus of claim 13, wherein the relay search message from the second UE is a ProSe direct discovery message and includes at least a second UE ID and the message to the base station comprises the second UE ID.

17. The apparatus of claim 13, wherein the initial message to the base station further includes an indication of link quality associated with an access link between the first UE and the base station.

18. The apparatus of claim 13, wherein the at least one processor is further configured to receive a first message from the base station requesting periodic reporting of second UE-to-relay link quality and transmitting a second message to the second UE requesting the periodic reporting based on the first message.

19. The apparatus of claim 13, wherein the at least one processor is further configured to transmit a relay association message to the second UE including a request to be the relay UE for the second UE.

20. The apparatus of claim 19, wherein the at least one processor is further configured to receive a message from the second UE declining the request from the first UE to be the relay for the second UE.

* * * * *